Jan. 14, 1969  R. L. LEWIS  3,421,321
INDICATING DEVICE FOR DUAL HYDRAULIC SYSTEM
Filed Oct. 24, 1966  Sheet 1 of 2

INVENTOR.
RICHARD L. LEWIS.
BY
*Richard G. Geib*
ATTORNEY.

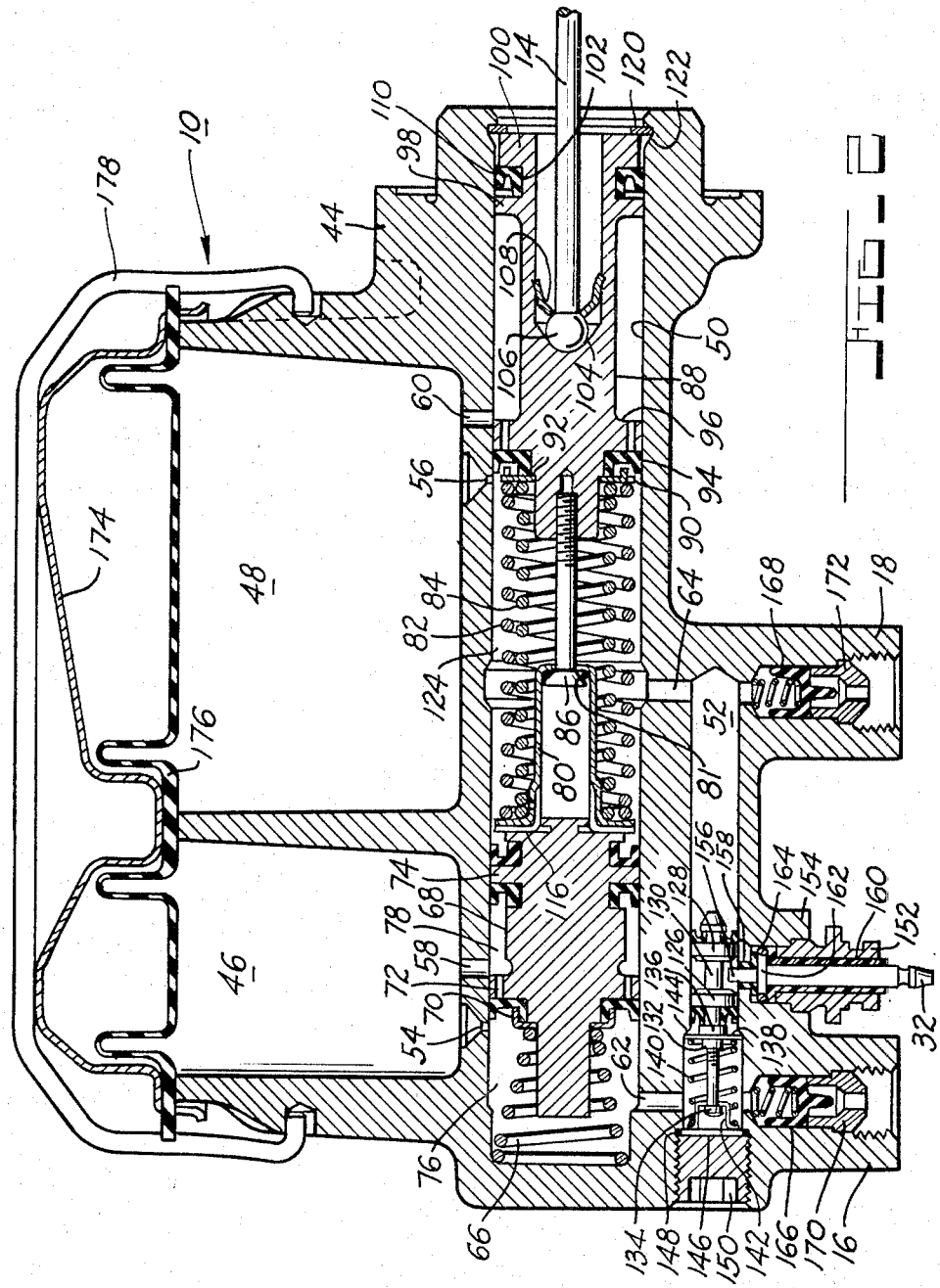

United States Patent Office 3,421,321
Patented Jan. 14, 1969

3,421,321
INDICATING DEVICE FOR DUAL HYDRAULIC SYSTEM
Richard L. Lewis, St. Joseph, Mich., assignor to The Bendix Corporation, a corporation of Delaware
Filed Oct. 24, 1966, Ser. No. 588,900
U.S. Cl. 60—54.6
Int. Cl. B60t 17/22
14 Claims

ABSTRACT OF THE DISCLOSURE

A pressure warning switch means that is integrated to a split master cylinder having a piston operated switch that is biased to a neutral position by a caged spring which piston is interposed between outlet ports from the separate variable volume chambers of the split master cylinder; and further having a caged spring assembly for connecting the master cylinder piston which has a sound deadening means precluding metal contact between a retainer and a caging bolt therefor.

---

Figure 1:
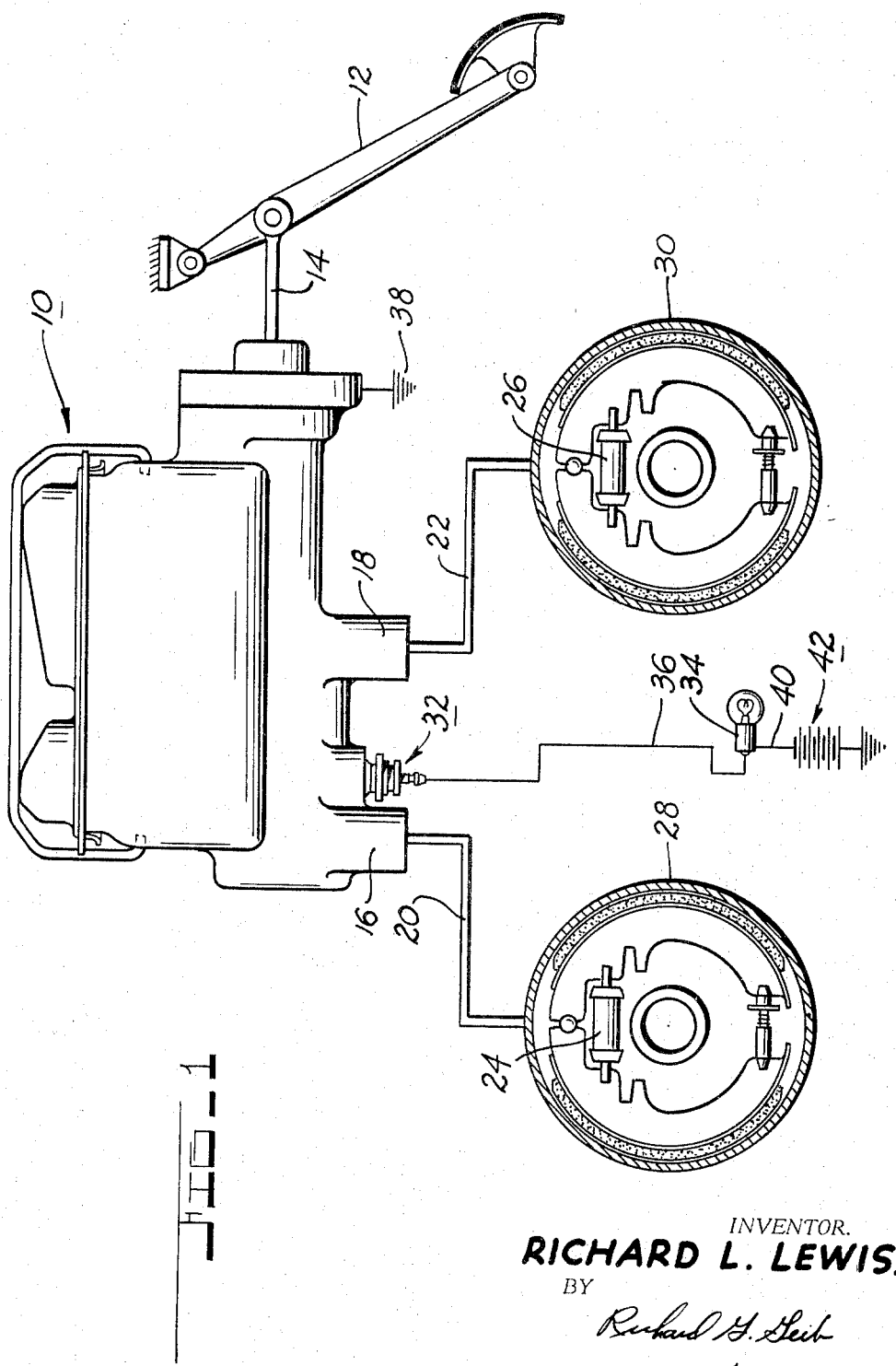

This invention relates to improvements for indicating devices for hydraulic systems, such as may be used in connection with vehicle brakes or hydraulic controlled mechanisms. More particularly, this invention is concerned with an indicating device for a split-system type hydraulic control mechanism for detecting a failure in any portion of the system and providing a readily noticeable indication of such failure.

With the advent of fail-safe braking for automotive vehicles as provided by the split-system type master cylinders, it has been observed that a failure in one or the other of the separate systems would not be adequately noticeable to an operator of the master cylinder. There have been some suggestions within the prior art for incorporating warning devices within such systems that would be indicative of a failure in one of the separate braking circuits. However, these prior art devices have all been suggestive of utilizing a piston subjected to the separate hydraulic pressures from the split-system type master cylinder which has been biased to a central position by springs on either ends thereof, or a piston which is held in a neutral position by seal frictions or the like. For the most part, the prior art has been suggestive of indicating means of this type which have been provided by remotely located valves with little or no thought given to integrating such a warning switch within a master cylinder. It is therefore a principal object of this invention to provide a split-system type master cylinder with an integral pressure warning switch that is positively and correctly centered by a spring assembly and which does not affect the displacement characteristics of the vehicle braking system in which it is associated.

It is a more detailed object of this invention to provide a piston switch for a failure warning device where the piston is held in a neutral position by a caged spring such that the piston is not loaded by spring forces while in the neutral position whereby the life of the hydraulic seals on the piston have been significantly increased.

It is still another broad object of this invention to provide a pressure responsive warning switch within a bore of a master cylinder that is parallel to the main bore of the master cylinder and open to the main bore by spaced passages between which a spring positioned piston switch is operable within a limited range whereby fluid displacement to operate the switch is negligible.

Other objects and advantages will appear from the following description of the drawings in which:

FIGURE 1 is a schematic illustration of a braking system embodying a master cylinder incorporating the failure warning switch in accordance with the principles of this invention; and FIGURE 2 is a cross sectional detail of the master cylinder shown in FIGURE 1 embodying a warning device in accordance with the principles of this invention.

With more particular reference to FIGURE 1 there is shown a master cylinder 10 that is operated by a brake pedal 12 interconnected to the master cylinder by a push rod 14 to develop separate pressures for separate outlets 16 and 18. The outlets 16 and 18 are connected by conduits 20 and 22 to wheel cylinders 24 and 26 of the rear vehicle brakes 28 and the front vehicle brakes 30, respectively. A switch plug 32 is related to the master cylinder 10 and is connected to an indicating light 34 by an electrical lead 36. The master cylinder 10 is grounded as at 38. The indicator 34 is connected by an electrical lead 40 to a power source 42, such as the battery of the vehicle.

With more particular regard now to the construction of the master cylinder 10 reference is made to FIGURE 2 showing the details of the master cylinder. More particularly, the master cylinder includes a housing 44 that is preferably of cast construction whereby reservoir cavities 46 and 48 along with a main bore 50 are formed at the time of the casting of the housing 44. After the casting operation, the housing is machined as by drilling, to provide a secondary bore 52, compensating ports 54 and 56 as well as filling ports 58 and 60 between the respective reservoir cavities 46 and 48 into the main bore 50. Also spaced passages 62 and 64, if not formed when the housing is cast are drilled between the main bore 50 and the secondary bore 52 at the time that the outlet ports 16 and 18 are being opened. Thereafter the secondary bore 52 and the drilled opening through the outlet ports 16 and 18 are tapped and the bores 50 and 52 are provided with a desired finish.

The internal parts are next assembled into the master cylinder by first assembling a return spring 66 and a spring bearing plate and seal retainer 70 to the secondary piston 68 by fitting the coils of spring 66 over a projection of piston 68. This assembly is inserted within the bore with the flanges 72 and 74 guiding the secondary piston 68 within the main bore 50. It should be noted that the secondary piston is fitted with a plurality of seals to maintain the integrity of a variable volume chamber 76 created between the end of the bore 50 and the secondary piston 68 as well as sealing a return chamber 78 between the flanges 72 and 74 from the area immediately behind the secondary piston 68.

Thereafter, a caged spring assembly comprising a spring retainer 80 and a pair of springs 82 and 84, or a single spring in an alternative form, is assembled by means of an adjusting bolt 86 to a primary piston 88 with a spring bearing plate and seal retainer 90 fitted against a shoulder 92 of the primary piston 88 ahead of the seal 94. A rubber ring 81 is placed under the head of bolt 86 to rest between the bolt and the retainer 80 after assembly of the caged spring assembly to the primary piston 88.

The primary piston also includes spaced flanges 96 and 98 and a shank portion 100 that is grooved, as at 102. The shank portion 100 is hollow and provided with a spherical bearing surface 104 to receive a ball end 106 of the push rod 14. However, prior to assembly of the push rod 14 to the primary piston 88 within the hollow shank 100, a cup-shaped spring retainer 108 is fitted within the bore in the shank 100 to be positioned immediately behind the spherical surfaces 104 and thereby permit the insertion of the ball end 106 while preventing the ball 106 from freeing itself from the primary piston 88 under normal situations, such as when a return spring (not shown) is returning the brake pedal 12 to its normal released position after the operator has removed his foot therefrom.

Prior to the assembly of the primary piston 88 and the cage spring assembly within the bore 50, a seal 110 is fitted over the shank 100. Thereafter, the primary piston and cage spring assembly is inserted within the bore 50, and a snap ring 120 is assembled to a groove 122 to position the primary and secondary pistons in their released attitude to rest immediately behind the compensating ports 56 and 54. The snap ring 120 then serves as a stop for the rearward position of the primary piston 88 and, because of the abutting relationship of the face 116 of the secondary piston 68 with the caged spring assembly, also limits the rearward position of the secondary piston 68. It should thus be realized that a variable volume chamber 124 is thereby created between the primary piston 88 and the secondary piston 68.

A failure warning device for assembly within the secondary bore 52 is in one form constructed by the machining of a stock piece of metal to have spaced lands 126 and 128 connected by a neck portion 130. A rod like projection 132 is provided on the land 126 and is machined to have a flange 136. A spring retainer 138 having an opening to pass over shank 132 is then placed against the flange 136 and a spring 140 is fitted over the rod-like projection 132 to rest on the retainer plate 138. Then a hat-shaped spring retainer 142 is placed against spring 140, and a bolt is threaded to the shank 132 until the head 134 of the bolt positions the retainer 142 to obtain the desired height for the spring 140.

The piston assembly is then inserted within the bore 52 until the retainer plate 138 bottoms on a shoulder 144 of the bore 52 that is formed by counterboring the bore 52 prior to the tapping and machining thereof. A plate 146 having a peripheral seal 148 is then placed within the bore 52 and a threaded plug 150 is tightened within the tapped end of the bore 52 to compress the peripheral seal 148 and thus seal the bore 52. It should be noted that the plate bottoms on the housing to prevent it from moving away from plug 150. The plate may be of a soft metallic construction whereupon the peripheral seal is not needed.

A switch plug 152 is then threaded within a boss 154 of the housing 44 to preferably position a stem contact 156 substantially equidistantly intermediate the lands 126 and 128 of the piston switch assembly. The contact stem 156 is insulated from the housing and the switch plug 152 by means of an inner insulating sleeve 158 and an outer insulating sleeve 160 which have facing flanges positioning a flange 162 of the contact stem 156 therebetween with a seal 164 therearound.

Thereafter spring biased residual pressure check valves 166 and 168 are positioned within the outlets 16 and 18 by means of press fitting tube seats 170 and 172 in these outlets, and a cap 174 having a diaphragm seal 176 thereunder is placed over the reservoir cavities 46 and 48 by means of a spring retainer 178 that permits ready installation of and removal of the cap 174 so that the fluid level in the reservoir chambers 46 and 48 may be serviced.

In operation, the operator of the vehicle will depress the brake pedal 12 to cause the primary piston 88 and the secondary piston 68, because of the caged spring connection therebetween, to simultaneously close off compensating ports 56 and 54. In the embodiment shown, pressure will thereafter be created in chamber 76 while the relative position of piston 88 and piston 68 is maintained by the springs 82 and 84. When the pressure in chamber 76 reaches a predetermined value, piston 88 then moves toward piston 68 to pressurize chamber 124. These pressures then will be delivered via a central opening within the residual pressure check valves 166 and 168 to the wheel cylinders 24 and 26 for actuation of the rear wheel brakes 28 and the front wheel brakes 30. It should be appreciated that the relationship of chambers 124 and 76 with respect to the front and rear brakes may be reversed.

Since there will be pressure developed by chamber 76 in advance of that being developed by chamber 124, the spring 140 must be chosen to hold the lands 126 and 128 immobile up to this value. Thereafter, the lands 126 and 128 will be pressure suspended and immobile so long as substantially equal pressure exist to each respective side. It should be appreciated that if a spring means of lesser force is used between pistons 68 and 88 that the spring 140 will be chosen accordingly so that the lands 126 and 128 will not move until after the point when chambers 124 and 76 have substantially equal pressures.

Generally speaking, it is undesirable to have the indicator 34 actuated below a certain braking pressure so that normal pressure drops in the system during actuation do not prematurely give a failure indication. Thus, in one embodiment tried so far it was determined that the warning switch would not be operated below 160 p.s.i. pressure differential between chambers 124 and 76.

If, for example, the chamber 76 could not develop a pressure within the range chosen, the increase of pressure on the land 128 will move the piston assembly so that the land 128 will contact the stem 156 and complete the circuit to the indicating light 34. In this action the spring 140 is compressed toward retainer 142. If, on the other hand, the chamber 124 were to fail to develop a pressure within the range mentioned, the pressure differential across lands 126 and land 128 will compress the spring 140 in the opposite direction (toward plate 138) to contact the land 126 with the stem 156 to also complete the circuit from the electrical power source 42 to the indicator light 34.

Having fully described the manner of construction of a device built in accordance with the principles of my invention as well as its operation, it is now desired to set forth the protection sought by these Letters Patent in the appended claims.

I claim:

1. In an indicating system, a master cylinder comprising:
   a housing having first and second bores therein which are communicated to each other by first and second passage means within said housing, one of said bores having a first outlet port and a second outlet port;
   first and second operatively connected piston means in said first bore dividing same into first and second variable volume chambers, said piston means being adapted to be controlled by means exterior to said housing for developing separate pressures in said first and second variable volume chambers communicated, respectively, to said first and second passage means;
   a third piston in said second bore operatively arranged therein between said first and second passage by caged spring means, said third piston having lands at each end thereof separated by a necked portion with seal means associated with said lands to maintain the integrity of each of said first and second variable volume chambers; and
   a switch pole limiting movement of said third piston by being operatively arranged between said lands in the area of said necked portion and normally spaced from said lands by the action of said spring means such that a circuit controlled by said pole is open until one of said lands contacts said pole as would be caused by a pressure differential between said first and second variable volume chambers whereupon the circuit closes to actuate the indicating system.

2. A master cylinder according to claim 1 wherein said first and second bores are parallel and have openings thereinto facing in opposite directions one of which is closed about a part of said means controlling said first and second pistons and another of which is closed by a spring bearing means for said spring means.

3. A master cylinder according to claim 1 wherein said first and second bores have openings thereinto one of which is closed about a part of said means controlling said first and second pistons and the other of which is closed by a spring bearing means for said spring means.

4. For use with a split system master cylinder having operator-operated means to develop separate pressures from two variable volume chambers in a housing for the master cylinder, a means to indicate the failure to develop any one of the separate pressures, said means comprising:

caged spring biased piston means in a bore in the housing that is parallel with and spaced from said variable volume chambers said piston means being between separated inlets open separately to one of said two chambers and another of said two chambers; and switch means operatively related to said piston means so as to be normally open whenever substantially equal pressures are developed in said variable volume chambers and closed whenever pressure in any one chamber falls below a predetermined level so that pressure in the other chamber overcomes the spring force to close said switch means.

5. The structure according to claim 4 wherein said switch means includes, a switch plug affixed in a radial opening into said bore, insulating sleeve means within said plug, and a contact stem within said sleeve means having one end in said bore for operative engagement with said piston means.

6. A means to indicate a failure according to claim 5 wherein said insulating sleeve means comprises:

an inner sleeve having an annular body sized to be sealingly fitted in the radial opening adjacent said bore and a flange to engage the housing therearound, an outer sleeve having an elongated annular body facing in an opposite direction than the annular body of said inner sleeve, said elongated annular body being sized to frictionally engage an opening through said plug and having a radial flange resting on the inner end of said plug; and a seal between the flange of said inner sleeve and the radial flange of said outer sleeve to seal the assembly of said switch means to said housing.

7. A means to indicate a failure according to claim 6 wherein said contact stem has a flange located by said inner and outer sleeves upon the assembly of said switch means to said housing.

8. A means to indicate a failure according to claim 7 wherein said caged spring means includes an adjustable length rod connected to said piston, a spring retainer connected to said rod and a spring between said rod and retainer to center said piston in said bore.

9. A master cylinder comprising:

a housing having an axial bore thereinto which is provided with spaced passage means, and further having a stepped bore with spaced inlets open to said spaced passage means;

means closing spaced movable walls in said axial bore for operating same remotely of said master cylinder to develop separate hydraulic pressures in one variable volume chamber between said housing and one of said movable walls and another variable volume chamber between said movable walls;

a piston in the smaller portion of said stepped bore, said piston having a projection from one face thereof and a neck portion connecting another face thereof to said one face thereof;

a caged spring assembly operatively connected to said projection and biased against a shoulder of said housing in the larger portion of said stepped bore by a plug affixed to the open end thereof, said caged spring assembly thereby positioning said piston between said spaced inlets; and a switch means including a switch plug threadedly secured to said housing, said plug having an insulated contact stem projecting into said stepped bore to normally underly said neck portion substantially equidistantly from the faces of said piston.

10. A master cylinder according to claim 9 and further comprising:

an electrical power source;

an indicating means having one terminal thereof connected to one side of said power source and another terminal connected to said contact stem; and means connecting said housing to another side of said power source such that contact of either face of said piston in opposition to said caged spring assembly will close a circuit from said power source to said indicating means.

11. A master cylinder according to claim 10 and further including means under the control of said walls to release fluid pressure on each face of said piston upon return of said walls to their rest position.

12. A master cylinder comprising:

a housing having a primary bore therein with spaced first and second outlet ports;

a remotely controlled piston slidably arranged in said primary bore;

a floating piston slidably arranged in said bore ahead of said remotely controlled piston whereby a first variable volume chamber is created between said pistons and a second variable volume chamber is created between said floating piston and the end of said primary bore in said housing;

a return spring in said second variable volume chamber between the housing and the floating piston; and a caged spring assembly operatively connecting said floating piston to said remotely controlled piston, said assembly including first retainer means operatively connected to said remotely controlled piston, second retainer means abutting said floating piston, spring means between said retainer means, a connecting means for joining said second retainer means to said remotely controlled piston, and a resilient ring about said connecting means between it and said second retainer means to provide noiseless contact of said second retainer means and said connecting means.

13. A master cylinder according to claim 12 and further comprising a secondary bore in said housing in which a pressure responsive warning switch is operatively arranged by a caged spring between said first and second outlet ports.

14. A master cylinder according to claim 13 wherein said pressure responsive warning switch includes a means to complete an electrical circuit to an indicator whenever pressure in said first and second outlets differs by a predetermined amount.

References Cited

UNITED STATES PATENTS

| 2,353,304 | 7/1944 | Green | 60—54.6 |
| 3,228,194 | 1/1966 | Blair | 60—54.5 |

MARTIN P. SCHWADRON, *Primary Examiner.*

ROBERT R. BUNEVICH, *Assistant Examiner.*

U.S. Cl. X.R.

188—152